(12) United States Patent
Heeke

(10) Patent No.: US 12,088,179 B2
(45) Date of Patent: Sep. 10, 2024

(54) SHIPPING RELEASE MECHANISM FOR ENGINE MOUNTED GENERATOR

(71) Applicant: Schaeffler Technologies AG & Co. KG, Herzogenaurach (DE)

(72) Inventor: Gregory Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 241 days.

(21) Appl. No.: 17/882,683

(22) Filed: Aug. 8, 2022

(65) Prior Publication Data

US 2024/0048028 A1 Feb. 8, 2024

(51) Int. Cl.
  *H02K 7/18* (2006.01)
  *H02K 5/04* (2006.01)
  *H02K 7/00* (2006.01)
  *H02K 9/19* (2006.01)

(52) U.S. Cl.
  CPC ............. *H02K 7/1815* (2013.01); *H02K 5/04* (2013.01); *H02K 7/003* (2013.01); *H02K 9/19* (2013.01)

(58) Field of Classification Search
  CPC ........ H02K 5/04; H02K 7/003; H02K 7/1815; H02K 9/19
  See application file for complete search history.

(56) References Cited

U.S. PATENT DOCUMENTS

| | | | | |
|---|---|---|---|---|
| 4,337,406 A | * | 6/1982 | Binder | H02K 7/1815 403/287 |
| 2008/0051249 A1 | * | 2/2008 | Maenner | H02K 15/16 477/3 |
| 2009/0302720 A1 | * | 12/2009 | Chiba | H02K 5/24 310/90 |
| 2010/0127508 A1 | * | 5/2010 | Aschaber | H02K 7/006 290/1 R |
| 2022/0154675 A1 | | 5/2022 | Payne et al. | |

* cited by examiner

*Primary Examiner* — Jue Zhang

(57) ABSTRACT

A generator module for a vehicle includes a housing arranged for fixing to a combustion engine, a generator arranged in the housing, a shaft, a spring, circumscribing the shaft, and a cup, circumscribing the spring. The generator has a stator, fixed to the housing, and a rotor, rotatable within the housing and including a rotor carrier. The shaft is fixed to the rotor carrier and the cup has an annular flange disposed axially between the spring and the housing. In an example embodiment, the housing has a pump housing for a cooling pump and the cup contacts the spring and the pump housing before the generator module is installed in the vehicle. In an example embodiment, the housing and the rotor carrier have complementary conical surfaces, and the spring is arranged to urge the complementary conical surfaces into contact.

13 Claims, 2 Drawing Sheets

US 12,088,179 B2

SHIPPING RELEASE MECHANISM FOR ENGINE MOUNTED GENERATOR

TECHNICAL FIELD

The present disclosure relates generally to a generator module, and more specifically to a shipping release mechanism for and engine mounted generator.

BACKGROUND

Generator modules are known. One example is shown and described in commonly-assigned United States Patent Application Publication No. US 2022/0154675 titled STARTER-GENERATOR WITH POWER ELECTRONIC UNIT to Payne et al., hereby incorporated by reference as if set forth fully herein.

SUMMARY

A generator module for a vehicle includes a housing arranged for fixing to a combustion engine, a generator arranged in the housing, a shaft, a spring, circumscribing the shaft, and a cup, circumscribing the spring. The generator has a stator, fixed to the housing, and a rotor, rotatable within the housing and including a rotor carrier. The shaft is fixed to the rotor carrier and the cup has an annular flange disposed axially between the spring and the housing. In an example embodiment, the housing has a pump housing for a cooling pump and the cup contacts the spring and the pump housing before the generator module is installed in the vehicle. In an example embodiment, the housing and the rotor carrier have complementary conical surfaces, and the spring is arranged to urge the complementary conical surfaces into contact.

In an example embodiment, the shaft has an annular surface and the spring is compressed between the annular flange and the annular surface before the generator module is installed in the vehicle. In an example embodiment, the cup is arranged to compress the spring to pull the spring away from the housing when the generator module is installed in the vehicle.

In some example embodiments, the annular flange is arranged at a first distal end of the cup and the cup also has a bolting flange arranged at a second distal end of the cup, opposite the first distal end. In some example embodiments, the rotor carrier has an attachment portion arranged for receiving a bolt to fix the rotor carrier to a combustion engine crankshaft of the vehicle, and the bolting flange is spaced axially apart from the attachment portion before the generator module is installed in the vehicle. In an example embodiment, the bolting flange is arranged to be displaced by the bolt and contact the attachment portion when the generator module is installed in the vehicle, and displacing the bolting flange towards the attachment portion compresses the spring to pull the spring away from the housing.

In some example embodiments, the housing has an aperture for receiving the bolt. In an example embodiment, the generator module also includes a cover plate fixed to the housing to cover the aperture after the generator module is installed in the vehicle. In an example embodiment, the generator module also has a cooling fluid pump, and the shaft is arranged to rotate the cooling fluid pump. In an example embodiment, the cup is a deep-drawn stamped cup. In an example embodiment, the generator module also includes a seal that seals the rotor carrier to the housing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
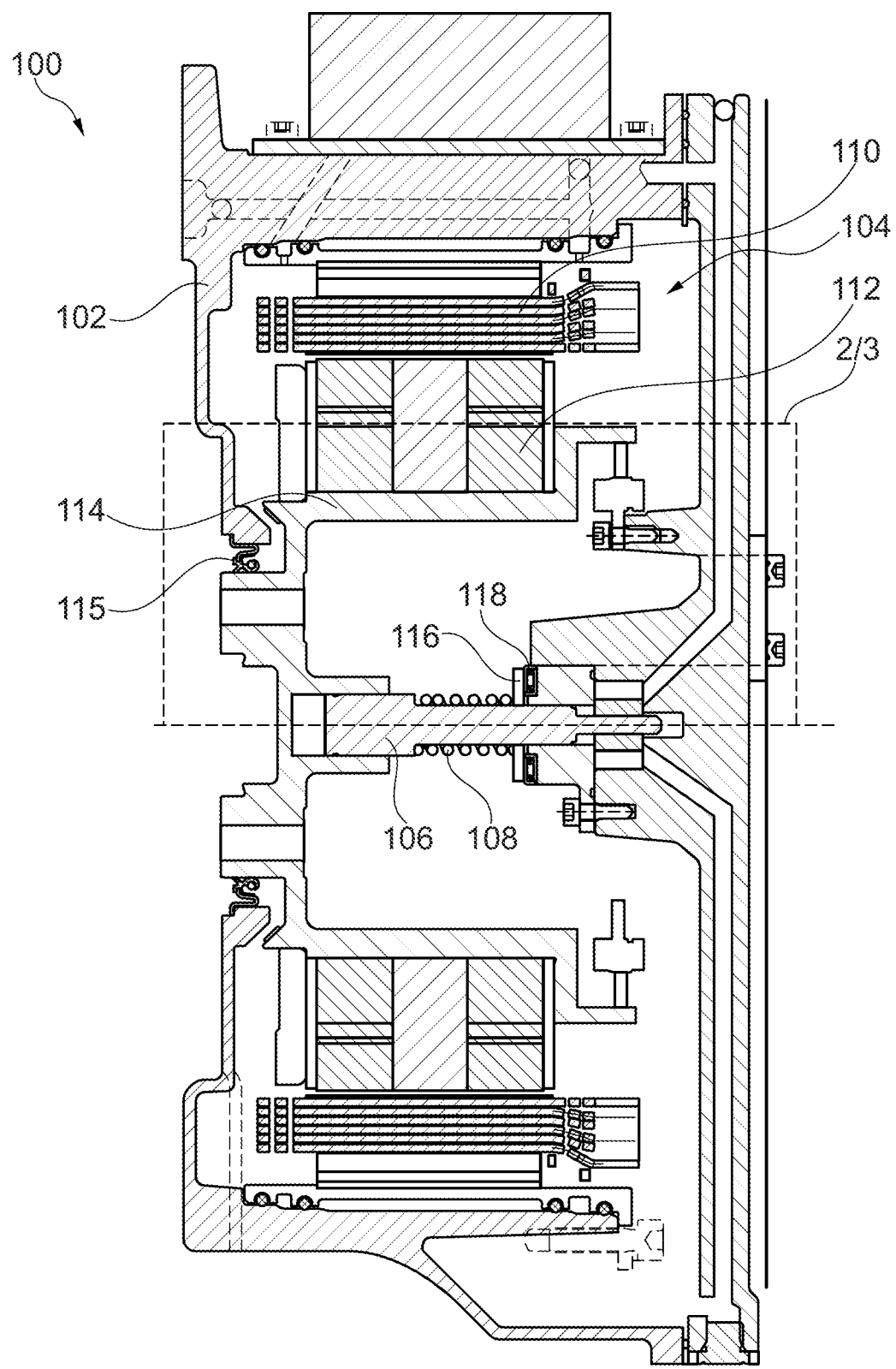
FIG. 1 illustrates a cross-sectional view of a generator module.

The following description is made with reference to FIG. 1. FIG. 1 illustrates a cross-sectional view of generator module 100. Generator module 100 includes housing 102 arranged for fixing to a combustion engine (not shown), generator 104, arranged in the housing, shaft 106, and spring 108, circumscribing the shaft. The generator includes stator 110, fixed to the housing, and rotor 112, rotatable withing the housing and including rotor carrier 114. Seal 115 seals the rotor carrier to the housing. The shaft is fixed to the rotor carrier. Spring 108 is arranged to push conical surfaces of the rotor carrier and housing together, similar to the embodiment described below. Washer 116 and bearing 118 permit rotation of the compressed spring relative to the housing during operation of the generator module.

Module 100 may be used in a vehicle (not shown) to generate electricity to propel the vehicle or provide power to a battery or external devices. Examples of external devices that may be powered by generator 100 include saws, drills, compressors, etc. on a jobsite; air conditioners, microwaves, electronics, etc. in a camper trailer, lights, refrigerators, pumps, etc. in a residential home; or projectors, public address systems, coolers, etc. at an outdoor venue. Although some examples of possible uses for the generator module are provided, countless other applications are possible and should be considered within the scope of this disclosure. Similarly, although module 100 is described as a generator module, module 100 may also be operated as an electric motor. For example, module 100 may act as a starter for a combustion engine or to provide additional torque to a vehicle drivetrain to help propel a vehicle.

When the conical surfaces are in contact, the rotor assembly is both axially and radially positioned relative to the housing and the stator assembly, since the stator assembly is fixed to the housing. This provides an air gap between the rotor assembly and stator assembly when the generator module is not attached to a combustion engine, for example. This air gap prevents damage to the rotor assembly and/or stator assembly during transport to and installation at an engine assembly facility, for example. The module also includes provisions for maintaining the air gap when the module is removed from the engine for service, for example. Once the module is attached to the engine, the air gap is maintained by positioning between an engine crankshaft and engine block, since the rotor assembly is bolted to the crankshaft and the housing is bolted to the engine block.

Figure 2:
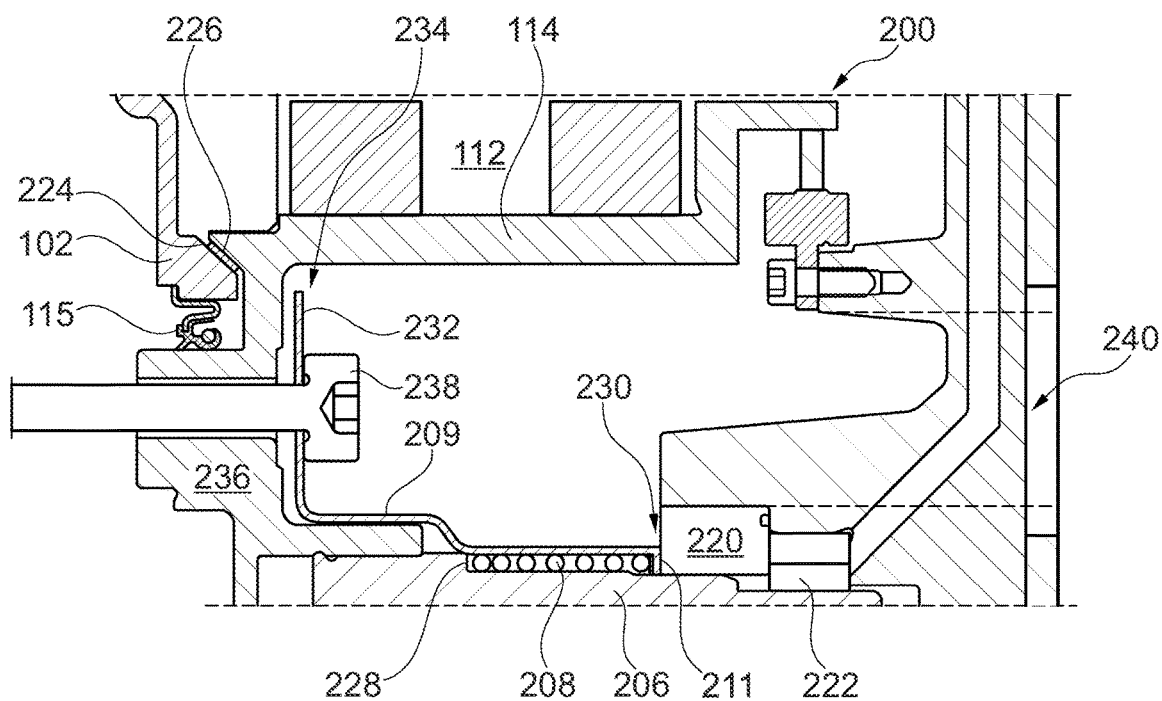
FIG. 2 illustrates a detail view of portion 2 of the generator module of FIG. 1 with an alternative centering method, shown prior to assembly with a combustion engine.
Figure 3:
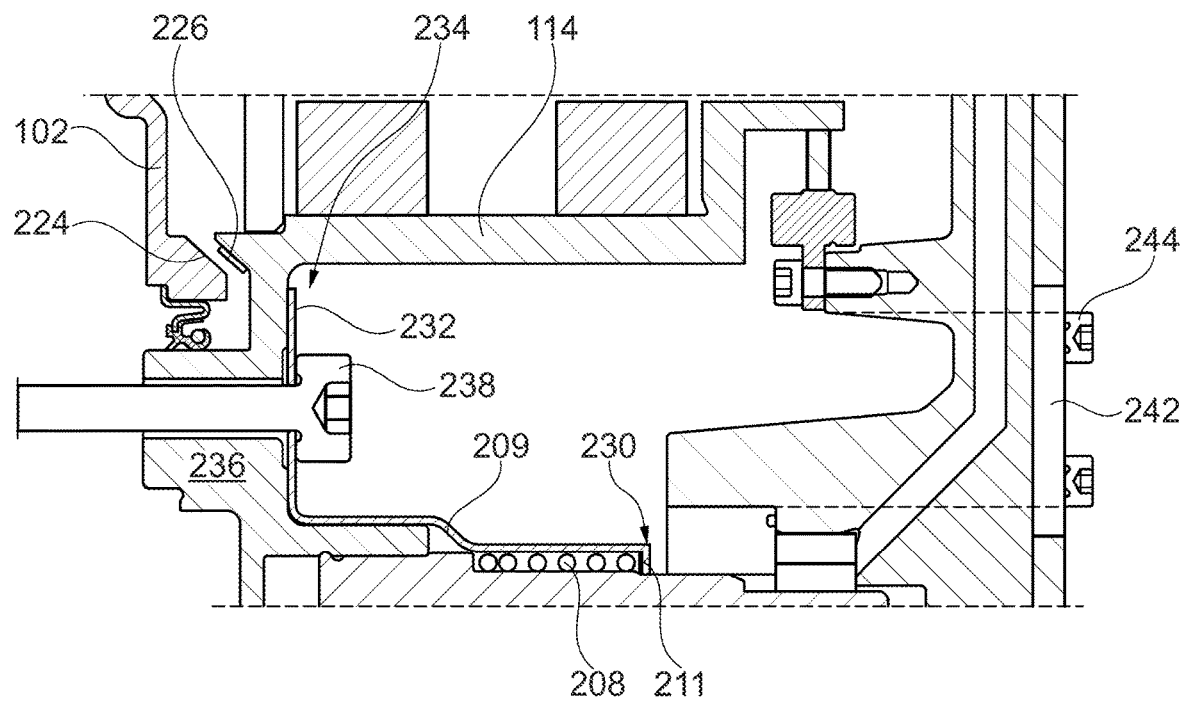
FIG. 3 illustrates a detail view of portion 3 of the generator module of FIG. 1 with the alternative centering method of FIG. 2, shown after assembly with a combustion engine.

The following description is made with reference to FIGS. 2-3. FIG. 2 illustrates a detail view of portion 2 of the generator module of FIG. 1 with an alternative centering method, shown prior to assembly with a combustion engine. FIG. 3 illustrates a detail view of portion 3 of the generator module of FIG. 1 with the alternative centering method of FIG. 2, shown after assembly with a combustion engine. Generator module 200 for a vehicle (not shown) includes housing 102 arranged for fixing to a combustion engine (not shown), generator 104, arranged in the housing, shaft 206, spring 208, circumscribing the shaft, and cup 209, circumscribing the spring and including annular flange 211 disposed axially between the spring and the housing. In the embodiment shown, the cup is a deep-drawn stamped cup. The generator includes stator 110 (ref. FIG. 1), fixed to the housing, and rotor 112, rotatable within the housing and including rotor carrier 114. Seal 115 seals the rotor carrier to the housing.

Housing 102 includes pump housing 220 for cooling pump 222, and, as shown in FIG. 2, for example, the cup contacts the spring and the pump housing before the generator module is installed in the vehicle. Shaft 206 is arranged to rotate the cooling fluid pump. Housing 102 and rotor carrier 114 include complementary conical surfaces 224/226 and the spring is arranged to urge the complementary conical surfaces into contact. In other words, when the module is assembled, the spring is preloaded such that it exerts an axial force between the housing and the shaft. Since the shaft is fixed to the rotor carrier, the force acts between the housing and the rotor carrier to force the rotor carrier to the left, as shown in FIG. 2, until the conical surfaces are in contact. This contact maintains an axial and radial position of the rotor carrier, and rotor, relative to the stator, to prevent damage from contact between the components. It should be noted that the spring force and angle of the conical surfaces is selected such that a centering force generated by forcing the conical surfaces together is greater than a magnetic force pulling the rotor and stator radially towards one-another.

Shaft 206 includes annular surface 228 and, as shown in FIG. 2, the spring is compressed between the annular flange and the annular surface before the generator module is installed in the vehicle. As shown in FIG. 3, however, the cup is arranged to compress the spring to pull the spring away from the housing when the generator module is installed in the vehicle. In other words, when the rotor carrier is fixed to an engine crankshaft (not shown) and the housing is fixed to an engine block (not shown), the spring is compressed by the cup so that the cup and the housing are separated by some axial gap. This allows the shaft (and cup) to rotate relative to the housing without a griding or wear from the spring pushing the cup against the housing.

As shown in FIGS. 2-3, the annular flange is arranged at distal end 230 of the cup and the cup includes bolting flange 232 arranged at distal end 234 of the cup, opposite distal end 230. Rotor carrier 114 includes attachment portion 236 arranged for receiving bolt 238 to fix the rotor carrier to a combustion engine crankshaft (not shown) of the vehicle, and, as shown in FIG. 2, for example, the bolting flange is spaced axially apart from the attachment portion before the generator module is installed in the vehicle. As shown in FIG. 3, the bolting flange is arranged to be displaced by the bolt and contact the attachment portion when the generator module is installed in the vehicle. Displacing the bolting flange towards the attachment portion compresses the spring to pull the spring away from the housing. Housing 102 includes aperture 240 for receiving the bolt, and the generator module includes cover plate 242 fixed to the housing (e.g., by bolts 244) to cover the aperture after the generator module is installed in the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Generator module
102 Housing
104 Generator
106 Shaft
108 Spring
110 Stator
112 Rotor
114 Rotor carrier
115 Seal
116 Washer
118 Bearing
200 Generator module 206 Shaft
208 Spring
209 Cup
211 Annular flange (cup)
220 Pump housing
222 Cooling pump
224 Conical surface (housing)
226 Conical surface (rotor carrier)
228 Annular surface (shaft)
230 Distal end (first)
232 Bolting flange (cup)
234 Distal end (second)
236 Attachment portion (rotor carrier)
238 Bolt
240 Aperture (housing)
242 Cover plate
244 Bolts (cover plate to housing)

What is claimed is:

1. A generator module for a vehicle, comprising:
a housing arranged for fixing to a combustion engine;
a generator arranged in the housing, the generator comprising:
   a stator, fixed to the housing; and
   a rotor, rotatable within the housing and comprising a rotor carrier;
a shaft, fixed to the rotor carrier,
a spring, circumscribing the shaft; and
a cup, circumscribing the spring and comprising an annular flange disposed axially between the spring and the housing.

2. The generator module of claim 1, wherein:
the housing comprises a pump housing for a cooling pump; and
the cup contacts the spring and the pump housing before the generator module is installed in the vehicle.

3. The generator module of claim 1, wherein:
the housing and the rotor carrier comprise complementary conical surfaces; and
the spring is arranged to urge the complementary conical surfaces into contact.

4. The generator module of claim 1 wherein:
the shaft comprises an annular surface; and
the spring is compressed between the annular flange and the annular surface before the generator module is installed in the vehicle.

5. The generator module of claim 1, wherein the cup is arranged to compress the spring to pull the spring away from the housing when the generator module is installed in the vehicle.

6. The generator module of claim 1 wherein:
the annular flange is arranged at a first distal end of the cup; and
the cup further comprises a bolting flange arranged at a second distal end of the cup, opposite the first distal end.

7. The generator module of claim 6, wherein:
the rotor carrier comprises an attachment portion arranged for receiving a bolt to fix the rotor carrier to a combustion engine crankshaft of the vehicle; and
the bolting flange is spaced axially apart from the attachment portion before the generator module is installed in the vehicle.

8. The generator module of claim 7 wherein:
the bolting flange is arranged to be displaced by the bolt and contact the attachment portion when the generator module is installed in the vehicle; and
displacing the bolting flange towards the attachment portion compresses the spring to pull the spring away from the housing.

9. The generator module of claim 7 wherein the housing comprises an aperture for receiving the bolt.

10. The generator module of claim 9 further comprising a cover plate fixed to the housing to cover the aperture after the generator module is installed in the vehicle.

11. The generator module of claim 1 further comprising a cooling fluid pump, wherein the shaft is arranged to rotate the cooling fluid pump.

12. The generator module of claim 1 wherein the cup is a deep-drawn stamped cup.

13. The generator module of claim 1 further comprising a seal that seals the rotor carrier to the housing.

* * * * *